(12) United States Patent
Giannelli (10) Patent No.: US 9,326,636 B2
(45) Date of Patent: May 3, 2016

(54) MACHINE AND METHOD FOR PREPARING BEVERAGES

(75) Inventor: William Giannelli, Olgiate Comasco (IT)

(73) Assignee: INGEGNI S.R.L., Milan (IT)

( * ) Notice: Subject to any disclaimer, the term of this patent is extended or adjusted under 35 U.S.C. 154(b) by 88 days.

(21) Appl. No.: 14/128,187

(22) PCT Filed: Jun. 20, 2012

(86) PCT No.: PCT/IB2012/053104
§ 371 (c)(1),
(2), (4) Date: Dec. 20, 2013

(87) PCT Pub. No.: WO2013/001416
PCT Pub. Date: Jan. 3, 2013

(65) Prior Publication Data
US 2014/0141141 A1    May 22, 2014

(30) Foreign Application Priority Data

Jun. 28, 2011 (IT) ................ MI2011A1176

(51) Int. Cl.
| | | |
|---|---|---|
| *A47J 31/40* | (2006.01) | |
| *A23F 3/18* | (2006.01) | |
| *A47J 31/44* | (2006.01) | |
| *B65D 85/804* | (2006.01) | |
| *A23L 2/39* | (2006.01) | |
| *A23F 5/26* | (2006.01) | |

(52) U.S. Cl.
CPC ............. *A47J 31/407* (2013.01); *A23F 3/18* (2013.01); *A23F 5/262* (2013.01); *A23L 2/39* (2013.01); *A47J 31/4492* (2013.01); *B65D 85/8046* (2013.01)

(58) Field of Classification Search
CPC ....... A47J 31/407; A47J 31/4492; A23F 3/18; A23F 5/262; B65D 85/8046; A23L 2/39
See application file for complete search history.

(56) References Cited

U.S. PATENT DOCUMENTS

| | | | |
|---|---|---|---|
| 4,577,080 A | | 3/1986 | Grossman |
| 2011/0045144 A1* | | 2/2011 | Boussemart et al. ........... 426/80 |

(Continued)

FOREIGN PATENT DOCUMENTS

| | | | |
|---|---|---|---|
| EP | 0426478 | | 8/1991 |
| FR | 1 564 088 | * | 3/1968 |

(Continued)

OTHER PUBLICATIONS

English Translation for FR 1564088 published Mar. 1968.*

(Continued)

*Primary Examiner* — Anthony Weier
(74) *Attorney, Agent, or Firm* — Steinfl & Bruno LLP (57) ABSTRACT

A machine for preparing beverages is described. The machine has a support structure which defines a first area for receiving a capsule that contains a beverage preparation and a second area for beverage delivery. The machine has support means for supporting the capsule containing a beverage preparation at the first area and means for directing a localized hot air jet to a predetermined localized portion of an enclosure of the capsule to form a first through opening in the predetermined localized portion thereby allowing the beverage preparation to come out therefrom.

14 Claims, 6 Drawing Sheets

(56) References Cited

U.S. PATENT DOCUMENTS

2011/0151075 A1* 6/2011 Peterson .................. 426/238
2012/0231126 A1* 9/2012 Lo Faro et al. ............ 426/115

FOREIGN PATENT DOCUMENTS

WO 2005/077811 8/2005
WO 2009/133134 5/2009

OTHER PUBLICATIONS

International Search Report mailed on Aug. 28, 2012 for PCT/IB2012/053104 filed on Jun. 20, 2012 in the name of Ingegni SRL.
Written Opinion mailed on Aug. 28, 2012 for PCT/IB2012/053104 filed on Jun. 20, 2012 in the name of Ingegni SRL.

* cited by examiner

MACHINE AND METHOD FOR PREPARING BEVERAGES

CROSS REFERENCE TO RELATED APPLICATIONS

The present application is the US national stage of International Patent Application PCT/IB2012/053104 filed on Jun. 20, 2012 which, in turn, claims priority to Italian Patent Application MI2011A001176 filed on Jun. 28, 2011.

The present invention relates to a machine for preparing beverages as defined in the preamble of claim 1.

In a further aspect, the invention also relates to a method of preparing beverages using a capsule containing a beverage preparation.

As used herein, the term beverage shall be intended to define not only beverages in a strict sense but also coffee, tea, milk, orange juice, creams, infusions, broths and the like.

At present, a beverage is typically prepared in a standard amount, such as a glass or a tea or coffee cup, by using a capsule that contains the proper amount of preparation to be mixed, diluted and/or brewed, to obtained said beverage amount.

The use of capsules allows instant preparation of standard amounts of beverage in a simple and quick manner, and also ensures consistent beverage quality. This is because each capsule is a sealed container that allows preservation of the organoleptic and quality properties of the dose of preparation contained therein over a long time, and prevents deterioration thereof due to exposure to air or contact with ambient humidity. Also, a modified oxygen-free atmosphere can be created within the capsule which, as is known, can cause oxidation and therefore deteriorate organoleptic properties of preparations.

The beverage preparation process requires the physical integrity of the capsules to be broken for the preparation to come out of the capsule before or after being mixed, diluted and/or brewed with liquid, generally water.

Typically, the physical integrity of the capsule enclosure is broken by a mechanical perforator. If mixing, dilution and/or brewing of the preparation occurs in the capsule itself, such mechanical perforator acts as a perforating/delivery nozzle, as liquid is introduced into the capsule through it.

It will be appreciated that, while the provision of a mechanical perforator or, even worse, a perforating/delivery nozzle is required and effective, it still involves certain drawbacks.

Hence, for example, in a machine for preparation of beverages of different tastes, the use of a single perforator or perforator/dispenser may cause contamination and/or alteration of the organoleptic properties of the prepared beverages which are well perceivable to the taste, when not visually, due to residues of previously prepared beverages.

This drawback is obviated in the prior art by providing machines for preparing beverages that have a plurality of mechanical perforators or perforating/delivery nozzles, to be selectively used according to the type of beverage to be prepared.

Nevertheless, it shall be noted that, even when a special perforator or perforating/delivery nozzle is used for each type of beverage, there is still the problem of residues left on the perforator, because the end of the perforator or perforating/delivery nozzle certainly contacts the preparation in the capsule at each use.

Even when the machine has a cleaning cycle, with the perforator or perforating/delivery nozzle being rinsed at each use, beverage preparations are still expected to leave residues on mechanical perforators or perforating/delivery nozzles, due to their nature.

Therefore, apparently the need is still strongly felt of preparing beverages using a capsule containing a beverage preparation, without incurring the problem of contaminating the capsule contents during beverage preparation.

This invention is based on the problem of providing a machine for preparing beverages using capsules containing a beverage preparation, which has such structural and functional characteristics as to fulfill the above need, while obviating the above prior art drawbacks.

This problem is solved by a machine for preparing beverages using a capsule for beverage preparation according to claim 1.

According to a further aspect, the object of the present invention is to provide a method for preparing a beverage from a capsule containing a beverage preparation, that can obviate the above mentioned drawbacks.

This object is fulfilled by a method for preparing a beverage from a capsule containing a beverage preparation as defined in claim 15.

Further features and advantages of the machine for preparing beverages using capsules containing a beverage preparation and of the method of the present invention from a capsule containing a beverage preparation will be apparent upon reading the following description of a few preferred embodiments thereof, which is given by way of illustration and without limitation with reference to the accompanying figures, in which.

Referring to the accompanying figures, numeral 1 generally designates a machine of the invention for preparing beverages using a capsule 2 containing a beverage preparation.

The capsule 2 is defined by an enclosure made of a thermoformable, heat-sealable food-grade material, that can be peeled off (like in yogurt cups), and/or molded in injection molds.

Examples of such materials include, without limitation: PET, PE, PE+EVOH+PE+PVC multilayer films, compostable Mater-bi and so on.

These materials generally have a melting point above 130° C., generally slightly above 140° C.

The machine 1 has a support structure 3 comprising a box-like body defining therein:

a first area A for receiving the capsule 2 containing a beverage preparation and a second area B for beverage delivery.

Preferably, the second beverage delivery area B is placed below said area A for receiving the capsule 2, for the beverage preparation to fall by gravity from the capsule 3 to the second beverage delivery area B.

The machine 1 comprises:
- capsule support means 4 for supporting the capsule 2 in the first area A,
- means 5 for forming at least one opening in the enclosure of the capsule, said means 5 being located proximate to said first area A and
- means for delivering a predetermined amount of liquid (in this example a liquid delivery conduit 8).

In the embodiment of the figures, the above mentioned support means include a frame 4 which is adapted to encircle the capsule at its sides and has a groove for sliding engagement with the peripheral edge 2a of the capsule 2.

Figure 1:
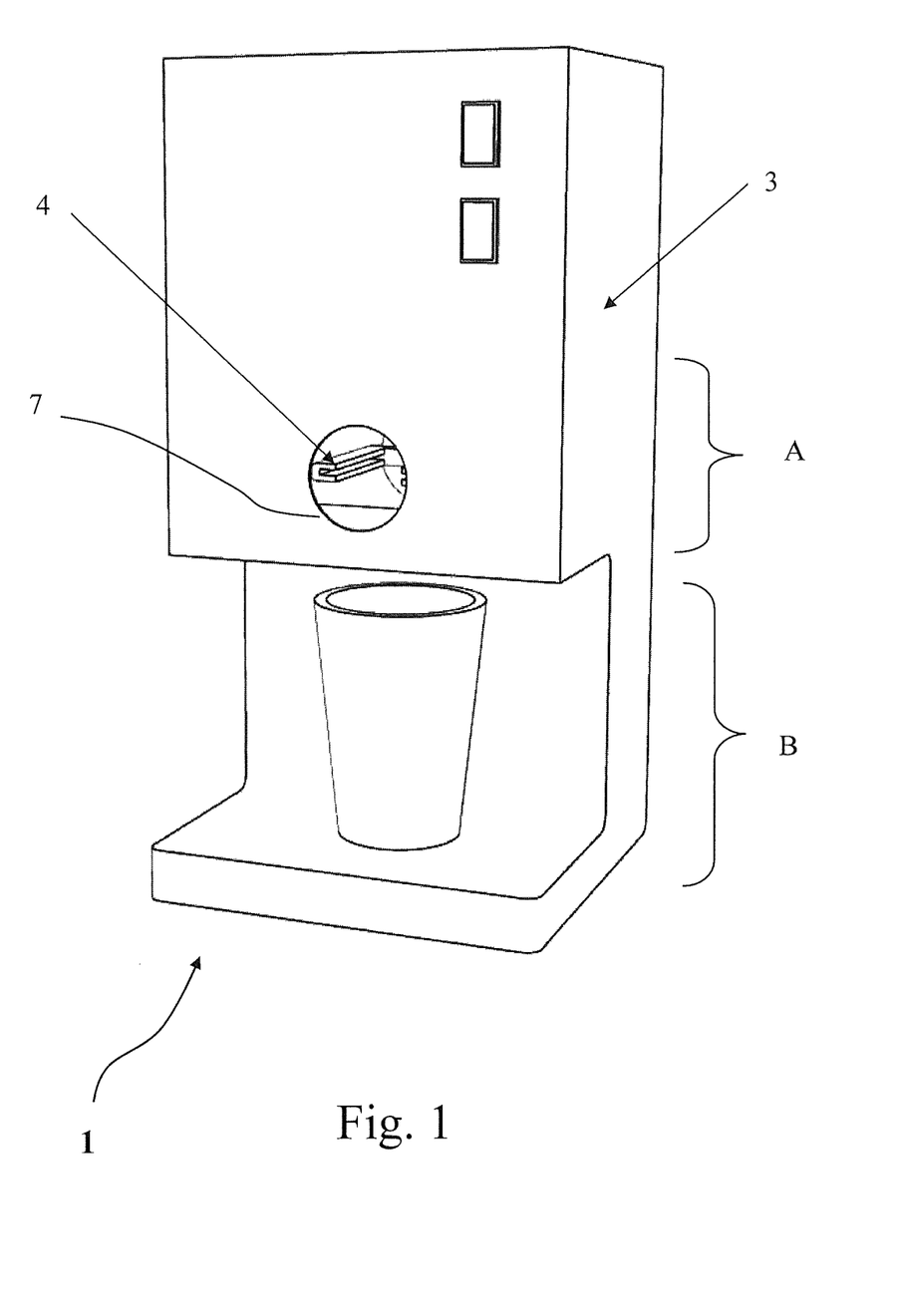
FIG. 1 is a perspective view of a machine for preparing beverages according to the present invention.
Figure 2:
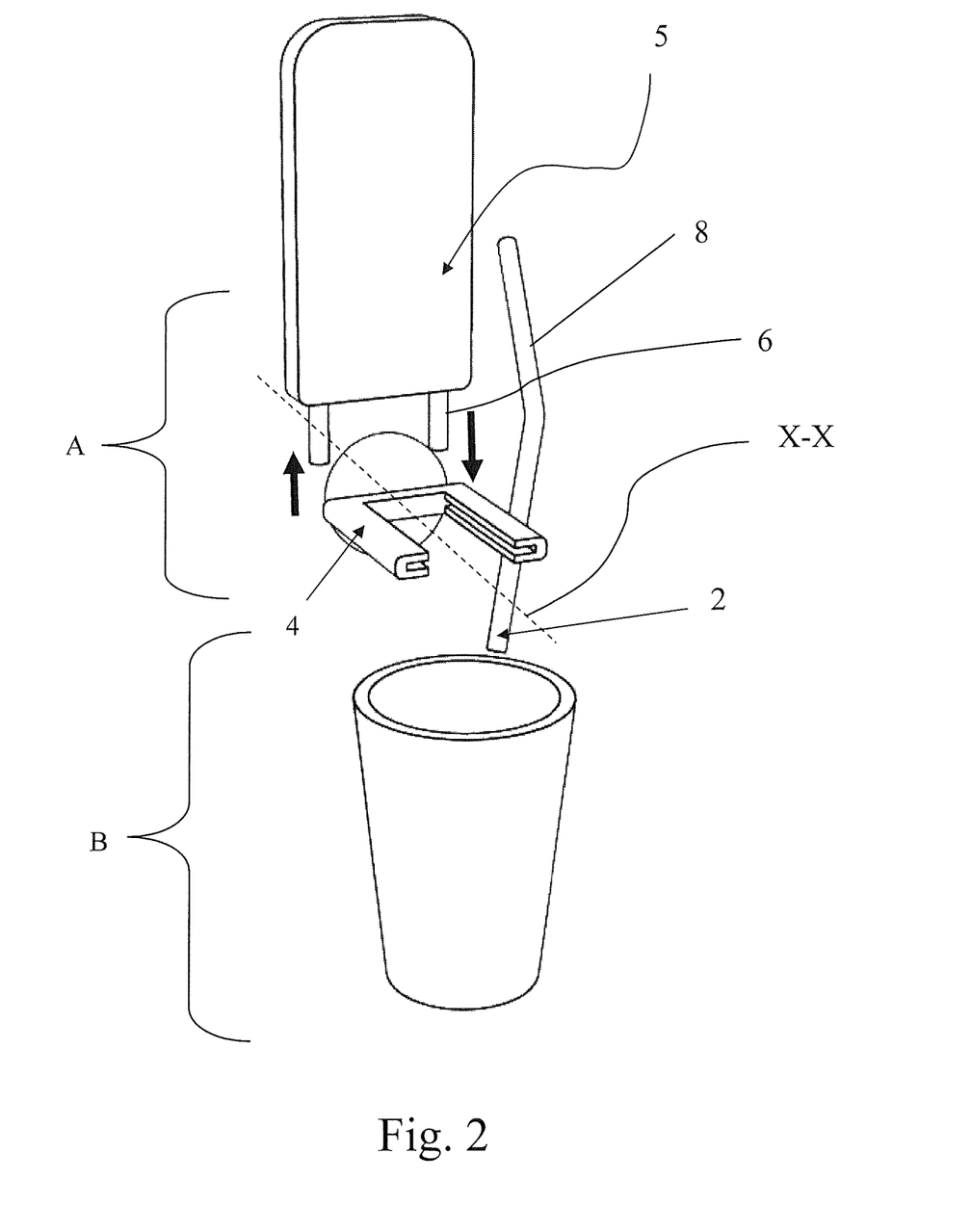
FIG. 2 is a schematic simplified perspective view of the interior of the machine of FIG. 1.
Figure 3A:
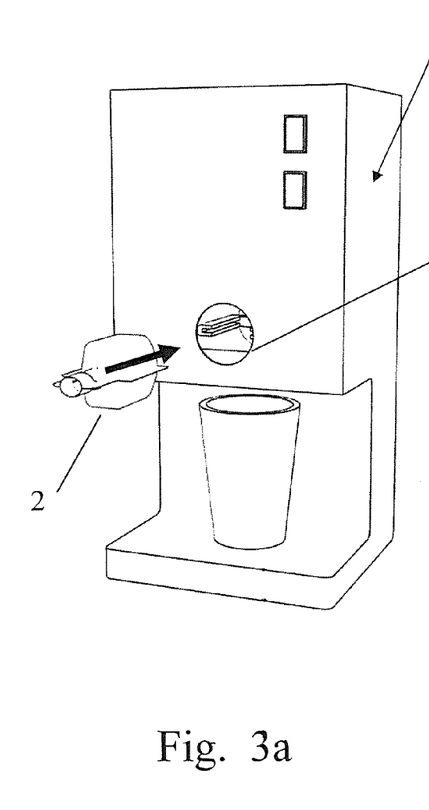
FIGS. 3a, 3b and 3c are perspective views of the machine of FIG. 1 while a capsule containing a beverage preparation is introduced into such machine.
Figure 3B:
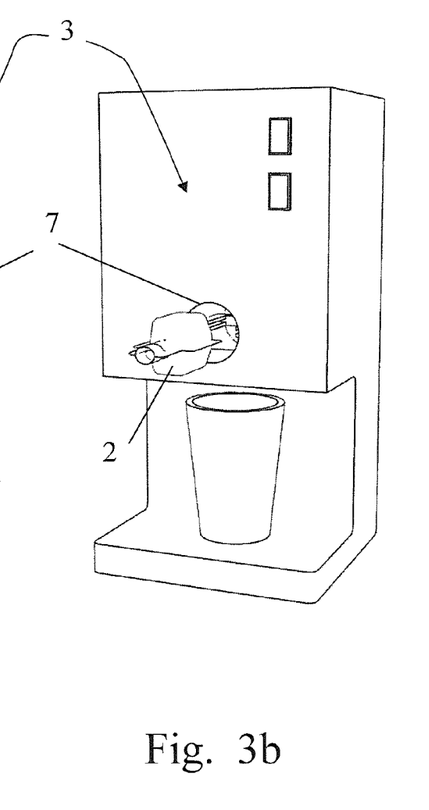
Figure 3C:
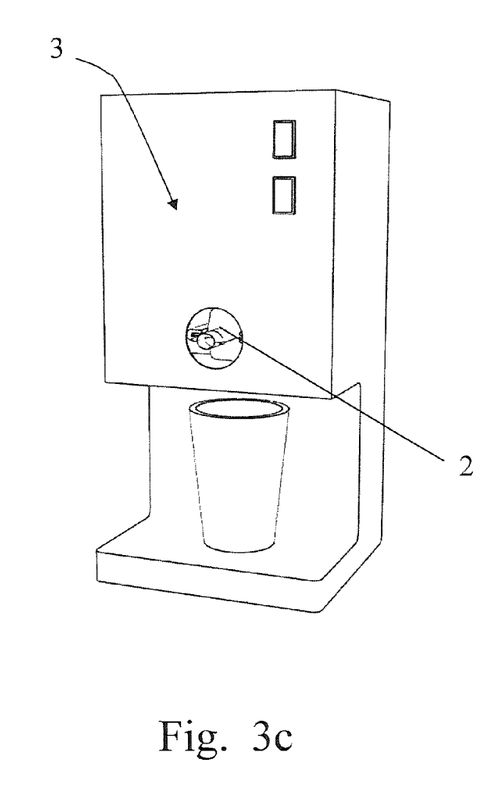
Figure 4:
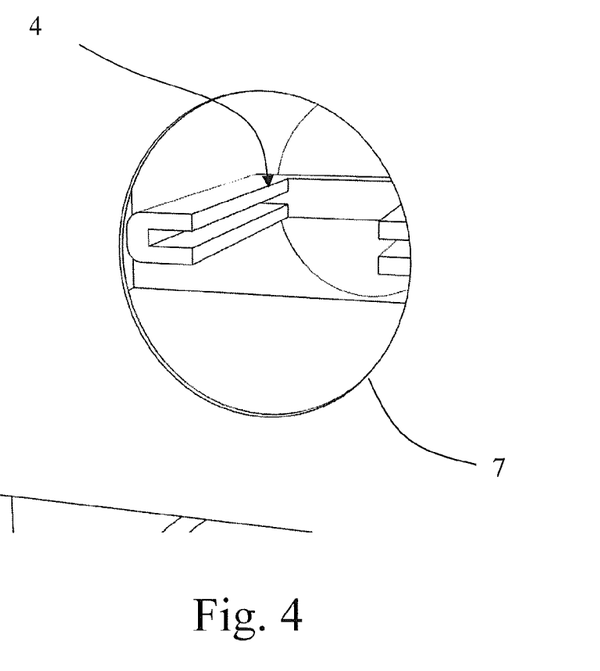
FIGS. 4 and 5 are two perspective views of an enlarged detail of the machine of FIG. 1 without and with a capsule held therein respectively.
Figure 5:
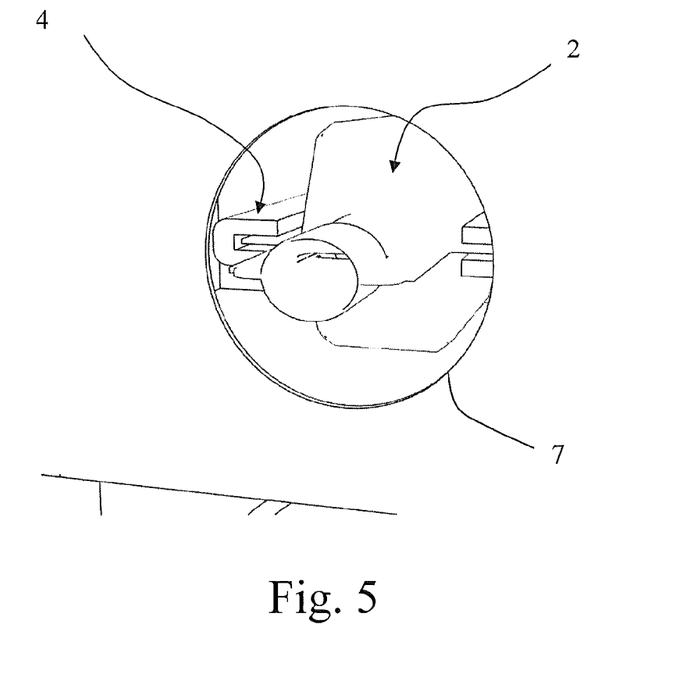
Figure 6:
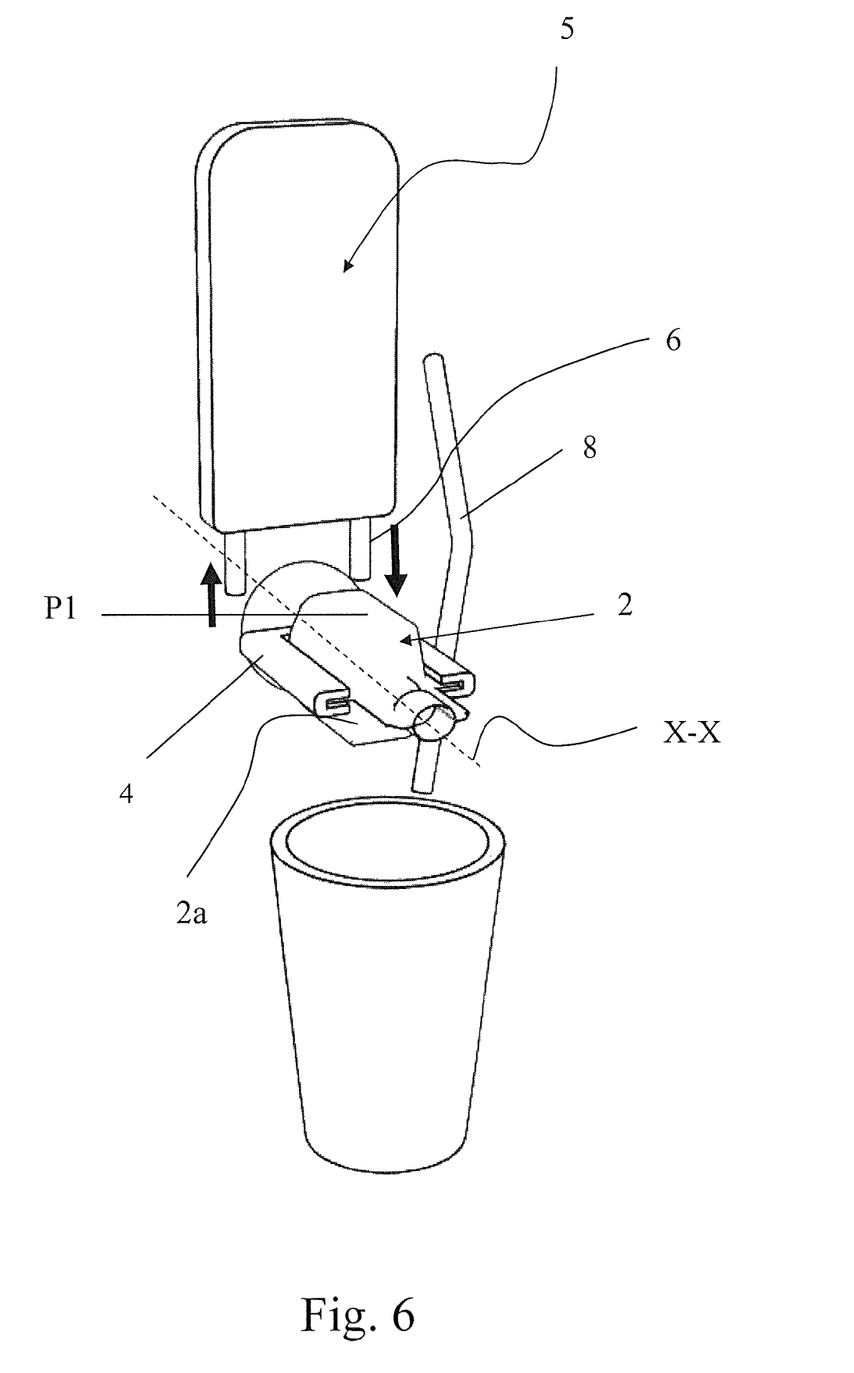
FIG. 6 shows a schematic simplified perspective view of FIG. 2 with a capsule placed on the support means.
Figure 7A:
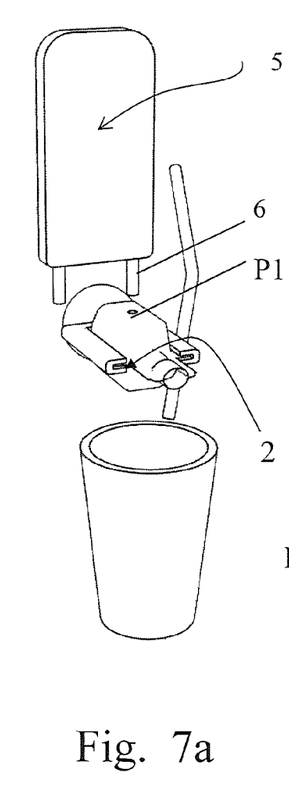
FIGS. 7a, 7b, 7c, and 7d show a sequence in which the machine supports a capsule, which, through various steps, has a first opening, is rotated 90°, is further rotated 90° and has a second opening respectively.
Figure 7B:
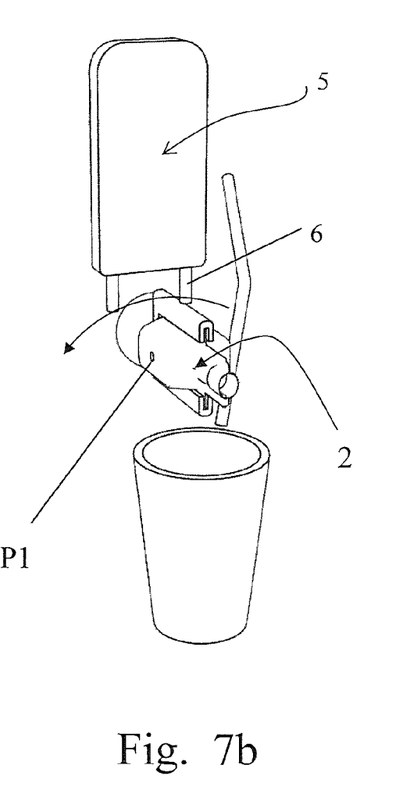
Figure 7C:
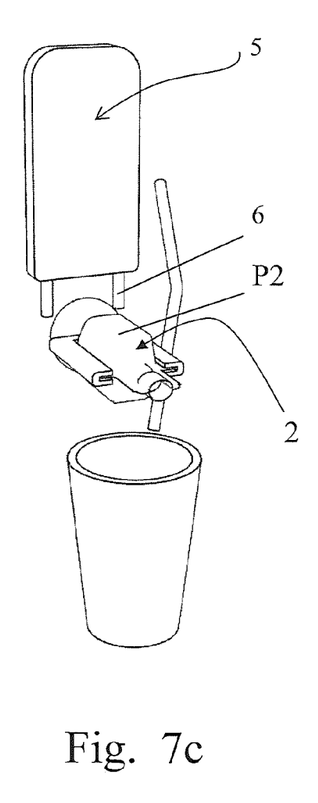
Figure 7D:
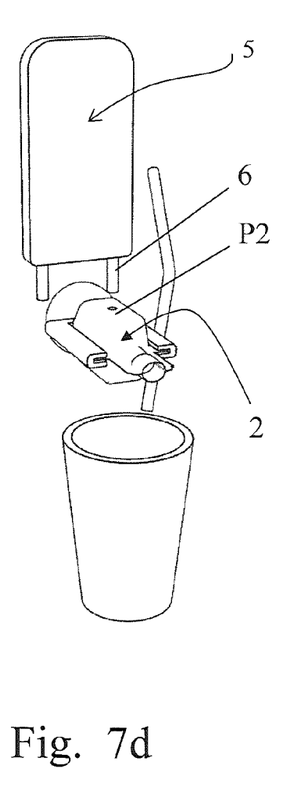

Namely, such frame 4 has two opposed portions, each adapted to receive the peripheral edge 2a of one side of the capsule 2. As shown in FIGS. 3a, 3b and 3c, the capsule 2 is adapted to be slid from the front side, with its peripheral edge 2a into the groove of the frame 4, to be suitably retained in position in said first area A of the machine 1.

For easy introduction of the capsule 2 from the outside into the front side of the frame 4 (see FIGS. 3a, 3b and 3c), the box-like body of the support structure 3 has an access opening 7 at said frame 4.

The support means 4 for the capsule 2 may be also other than the above described frame as shown in the figures, and include for instance a gripper, a body defining a capsule-receiving seat, a guide channel along which the capsule may be positioned or further structurally and/or functionally equivalent arrangements.

Preferably, the support means 4 for the capsule 2 are supported by the support structure 3 of the machine 1 to rotate about an axis of rotation X-X that extends horizontally with respect to the ground, the machine 1 comprising drive means (not shown) for causing and controlling the rotation of the support means 4 about such axis of rotation X-X. Due to the above, the support means 4 for the capsules 2 may change the orientation of their position (e.g. by a 180° rotation about the axis X-X) thereby causing the capsule 2 supported thereby to be turned upside-down without being released from the support means 4.

Advantageously, the above mentioned means 5 for forming at least one through opening in the enclosure of a capsule include localized heating means that can direct a localized thermal flux to a restricted portion of said first area A at which the support means 4 support the capsule 2, to generate localized heating in a local portion P1 of the enclosure of the capsule 2 for causing the enclosure of said capsule 2 to lose its physical integrity, thereby forming a first through opening in such enclosure which is adapted to allow the beverage preparation to come out of the capsule 2.

According to a preferred embodiment, the above mentioned localized heating means 5 include a nozzle 6 from which a hot fluid jet is ejected as needed.

Advantageously, according to a simple and effective embodiment, such hot fluid jet is a hot air jet. For this purpose, the machine 1 comprises means for generating an air flow (not shown) and means 5 for heating such air flow. In this configuration, a hot air jet is ejected from the nozzle 6 and is directed against said local portion P1 of the enclosure of the capsule 2.

It will be appreciated that, under particular conditions, an overheated gas or steam may be also used as a fluid.

If the fluid is overheated steam, the machine will include means for generating overheated steam to be delivered through the nozzle.

Alternatively to the above, such localized heating means 5 for directing a localized thermal flux include a laser emitter or an infrared lamp or other heating means that can heat the above mentioned local portion P1 of the enclosure by directing a localized thermal flux against said portion P1, without contacting the capsule directly but only with the thermal flux.

In order to break the physical integrity of the enclosure without any direct physical contact but by only directing the above mentioned thermal flux against said enclosure, such thermal flux shall be simply adapted to cause the capsule enclosure to lose its physical integrity upon local softening and/or local melting of the material that forms the capsule enclosure.

It shall be noted in this respect that experimental tests made on capsules of different materials showed that, by heating a local portion of the enclosure to a temperature near the melting point but without reaching the melting point of the material, the capsule enclosure was perforated with the desired first through opening being formed therein.

Considering:
- the nature of the above mentioned materials adapted to form the capsule 2 and
- that, for instance, in case of thermoformable or heat-sealable materials, heat sealing between two layers occurs at about 140° C., a few degrees of temperature rise being enough for the material to melt instead of being heat-sealed, a first through opening will be formed in the enclosure of the capsule 2 by local heating by means of a thermal flux that simply causes the material at said local portion P2 of the enclosure to reach a temperature ranging from 130° C. to 180° C., preferably from 145° C. to 160° C.

In the preferred embodiment as shown in the figures, the hot fluid is a hot air fluid and the above mentioned temperature values indicate the temperature values to be reached by the hot air ejected from the nozzle 6.

If the above mentioned localized heating means 5 for directing a localized thermal flux consist of a laser emitter or an infrared lamp, then the above temperature values indicate the temperature to be reached by the portion of the enclosure upon which the thermal flux of the laser or the infrared lamp impinges.

Preferably, the above mentioned restricted portion of the area at which the support means 4 support the capsule 2 has a surface area ranging from 5 $mm^2$ to 200 $mm^2$, preferably of about 10 $mm^2$.

Preferably, the machine 1 comprises vibrating means for causing vibrations/shakes in the capsule 2 supported by the support means 4, to allow the beverage preparation to more easily come out from the capsule through an opening in its enclosure. This is particularly, but without limitation, advantageous if the beverage preparation is in solid form, i.e. in powder or granules.

Preferably, the above mentioned vibrating means are associated with the capsule support means 4.

The method of preparing a beverage from a capsule that contains a beverage preparation, comprises the steps of:
- providing a capsule 2 that comprises a beverage preparation;
- forming at least one first through opening in a first localized portion P1 of the enclosure of said capsule 2 which opening is designed to allow the beverage preparation to come out of the capsule;
- causing the beverage preparation to come out of the capsule 2 through such through opening and
- mixing such beverage preparation with a liquid.

Advantageously, the above mentioned step of forming at least one first through opening in a first local portion P1 of the enclosure of the capsule 2, which opening is designed to allow the beverage preparation to come out of the capsule, is carried out by directing a localized thermal flux to said first local portion P1 of the enclosure to cause the enclosure of the capsule 2 to lose its physical integrity, due to local softening and/or local melting of the local portion P1 of the material that forms the capsule enclosure.

Preferably, such thermal flux consists of a hot fluid jet, the hot fluid being preferably air at a temperature ranging from 130° C. to 180° C., preferably from 145° C. to 160° C.

Alternatively, a jet of overheated steam may be directed or an adequate thermal flux may be generated to cause local softening and/or local melting of the local portion P1 of the material that forms the capsule enclosure.

Preferably, the first local portion P1 of the enclosure of the capsule 2 is an upper portion of such capsule, i.e. an upward portion of the capsule 2, the up and down directions being related to the position of the capsule relative to the ground.

Preferably, in this case, once the first through opening has been formed in the upper part of the capsule, the latter is overturned to allow the beverage preparation to fall by gravity from the capsule through said first through opening.

Preferably, a second through opening is formed in the enclosure of the capsule 2, at a second local portion P2 of the enclosure of the capsule 2, before having the beverage preparation come out from the capsule 2 through said first through opening.

Preferably, the second through opening is formed once the capsule 2 has been overturned, by directing the same localized thermal flux to the second local portion P2 of the enclosure of the capsule 2.

For the beverage preparation to more easily come out of the capsule 2, the capsule 2 may be conveniently vibrated or shaken.

It shall be noted that the capsule 2 generally has an inner volume that is larger than the volume of the beverage preparation contained therein, whereby the capsule is found to have an enclosure portion that is not contacted nor licked by said beverage preparation, Since the beverage preparation fills the capsule 2 from the bottom, due to gravity, this portion of the enclosure not contacted nor licked by the beverage preparation is in the upper part of the capsule 2.

In view of this, the above mentioned first local portion P1 of the enclosure of the capsule 2 is found to be coincident with the enclosure portion that is not contacted nor licked by the beverage preparation. Advantageously, this will afford effective and quick heating of the local portion P1 of the enclosure upon which the above mentioned thermal flux impinges, as this portion is not contacted by the beverage preparation and the thermal energy received by this local portion of the enclosure cannot be easily dissipated, and hence causes a local increase of the enclosure temperature, which will melt, thereby being perforated.

Advantageously, the above mentioned method steps may be carried out by the above mentioned machine 1.

As clearly shown in the above description, the machine of the invention and the method of the invention can fulfill the above mentioned need and also obviate the prior art drawbacks as set out in the introduction of this disclosure.

Thus, the first through opening is quickly and simply formed in the enclosure of the capsule that contains the beverage preparation, without requiring a perforator or any other object to contact the capsule enclosure and the beverage preparation contained therein, thereby avoiding any contamination of the beverage preparation contained in the capsule.

Furthermore, the machine of the invention requires no periodic cleaning of a perforator or any other equivalent part, as the machine has no such part.

Yet another advantage of the machine of the present invention is its simple construction, which ensures proper longtime use without requesting any particular maintenance.

Those skilled in the art will obviously appreciate that a number of changes and variants may be made to the above machine and method, still within the scope of the invention, as defined in the following claims.

Thus, for instance, the capsule may be rotated or overturned in a different manner, while it is supported in the first area A of the machine by the specially designed capsule support means.

Also, an embodiment may be provided in which the above mentioned means for forming at least one through opening in the enclosure of a capsule are movable, to change their operating position.

The invention claimed is:

1. A machine for preparing beverages using a capsule that contains a beverage preparation, comprising:
    a support structure which defines a first area for receiving a capsule that contains a beverage preparation and a second area for beverage delivery;
    capsule support means for supporting the capsule containing the beverage preparation at said first area; and
    means for forming at least one opening in an enclosure of the capsule containing the beverage preparation, said means for forming at least one opening in the capsule being located proximate to said first area to act on the capsule supported by said capsule support means,
wherein:
    said means for forming at least one through opening in the enclosure of the capsule include localized heating means for directing a localized thermal flux to a restricted portion of an area at which said capsule support means for the capsule containing the beverage preparation, to generate localized heating in a local portion of the enclosure of the capsule supported by said support means for causing the enclosure of said capsule to lose its physical integrity without being in direct contact with said enclosure, thereby forming a first through opening in the enclosure of said capsule which is adapted to allow the beverage preparation to come out of the capsule without interference with said restricted portion of the area at which said support means support the capsule containing the beverage preparation,
    said capsule support means are supported by said support structure in a rotatable manner, and
    said machine comprises drive means for causing and controlling rotation of said capsule support means relative to said support structure to cause the capsule supported by said capsule support means to be overturned.

2. The machine as claimed in claim 1, wherein:
    said localized heating means for directing the localized thermal flux comprise a delivery nozzle from which a hot fluid jet is ejected,
    said machine comprises means for generating an airflow and means for heating the airflow generated by said means for generating the airflow, and
    a hot air jet, heated in said heating means of the machine, the hot air jet coming out of said delivery nozzle.

3. The machine as claimed in claim 2, wherein:
    said machine comprises means for generating overheated steam, and
    an overheated steam jet, generated by said means for generating overheated steam, comes out of said delivery nozzle.

4. The machine as claimed in claim 1, comprising vibrating means associated with said capsule support means to cause the capsule supported by said capsule support means to be vibrated/shaken.

5. A method of preparing a beverage from a capsule that contains a beverage preparation, comprising the steps of:
providing a capsule that comprises a beverage preparation;
forming a first through opening in a first localized portion of an enclosure of said capsule, and a second through opening at a second localized portion of the enclosure of said capsule;
causing the beverage preparation to come out of said capsule through said first and second through openings, and mixing said beverage preparation with a liquid,
wherein:
said forming the first through opening in the first localized portion of the enclosure of said capsule is carried out by directing a localized thermal flux to said first localized portion of the enclosure of said capsule to cause the enclosure of the capsule to lose its physical integrity, due to localized softening and/or localized melting of the localized portion of a material of said enclosure at said localized portion, and
said second through opening is formed after overturning said capsule by directing said localized thermal flux to said second localized portion of the enclosure of said capsule.

6. The method as claimed in claim 5, further comprising a step of vibrating or shaking said capsule to cause said beverage preparation to fall by gravity through said first through opening.

7. The method as claimed in claim 5, wherein said forming the first through opening in the first localized portion of the enclosure of said capsule is carried out without contacting the enclosure of said capsule by a solid body.

8. The method as claimed in claim 5, wherein said localized thermal flux is directed towards said first localized portion of the enclosure of said capsule to cause a pass-through opening in said enclosure without be in contact with said enclosure of said capsule.

9. The method as claimed in claim 5, wherein said thermal flux is obtained by a hot fluid jet directed against said first localized portion of the enclosure of the capsule.

10. The method as claimed in claim 9, wherein said hot fluid is air or overheated steam.

11. The method as claimed in claim 5, wherein said first localized portion of the enclosure of said capsule is a portion of the capsule that faces upwards, with reference to a position of the capsule relative to a floor.

12. The method as claimed in claim 11, comprising the step of overturning said capsule after forming said first through opening, to cause said beverage preparation to fall by gravity from said capsule through said at least one first through opening.

13. A method of preparing a beverage from a capsule that contains a beverage preparation, comprising the steps of:
providing a capsule that comprises a beverage preparation;
forming at least one first through opening in a first localized portion of an enclosure of said capsule;
causing the beverage preparation to come out of said capsule through said at least one first through opening, and mixing said beverage preparation with a liquid,
wherein:
said forming at least one first through opening in the first localized portion of the enclosure of said capsule is carried out by directing a localized thermal flux to said first localized portion of the enclosure of said capsule to cause the enclosure of the capsule to lose its physical integrity, due to localized softening and/or localized melting of the localized portion of a material of said enclosure at said localized portion,
said capsule has an inner volume that is larger than a volume of the beverage preparation contained therein, whereby said capsule is found to have an enclosure portion that is not contacted nor licked by said beverage preparation, and
said first localized portion of the enclosure of said capsule is found to be coincident with said enclosure portion that is not contacted or licked by said beverage preparation.

14. A method of preparing a beverage from a capsule containing a beverage preparation, comprising the steps of:
providing a capsule comprising a beverage preparation;
forming at least one first through opening in a first localized portion of an enclosure of the capsule;
causing the beverage preparation to come out of the capsule through the at least one first through opening, and mixing the beverage preparation with a liquid,
wherein the steps are carried out by a machine comprising:
a support structure which defines a first area for receiving the capsule that contains the beverage preparation and a second area for beverage delivery;
capsule support means for supporting the capsule containing the beverage preparation at said first area; and
means for forming the at least one first through opening, said means for forming the at least one first through opening being located proximate to said first area to act on the capsule supported by said capsule support means,
wherein:
said means for forming the at least one first through opening include localized heating means for directing a localized thermal flux to a restricted portion of an area at which said capsule support means for the capsule containing the beverage preparation, to generate localized heating in a local portion of the enclosure of the capsule supported by said support means for causing the enclosure of said capsule to lose its physical integrity without being in direct contact with said enclosure, thereby forming the first through opening in the enclosure of said capsule which is adapted to allow the beverage preparation to come out of the capsule without interference with said restricted portion of the area at which said support means support the capsule containing the beverage preparation, and
wherein the forming the at least one first through opening in the first localized portion of the enclosure of the capsule is carried out by directing the localized thermal flux to the first localized portion of the enclosure of the capsule to cause the enclosure of the capsule to lose its physical integrity, due to localized softening and/or localized melting of the localized portion of a material of the enclosure at the localized portion.

* * * * *